UNITED STATES PATENT OFFICE 2,163,172

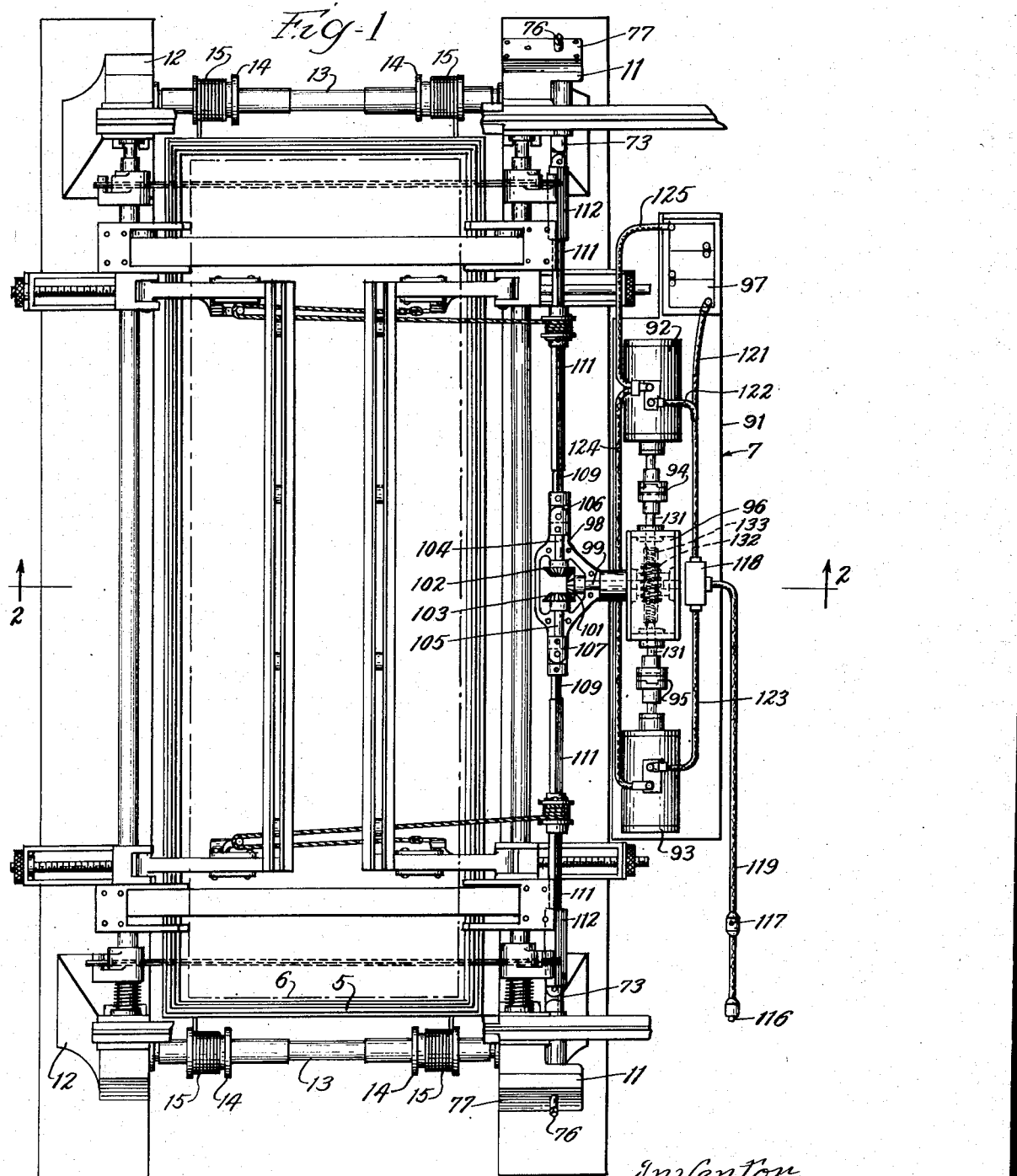

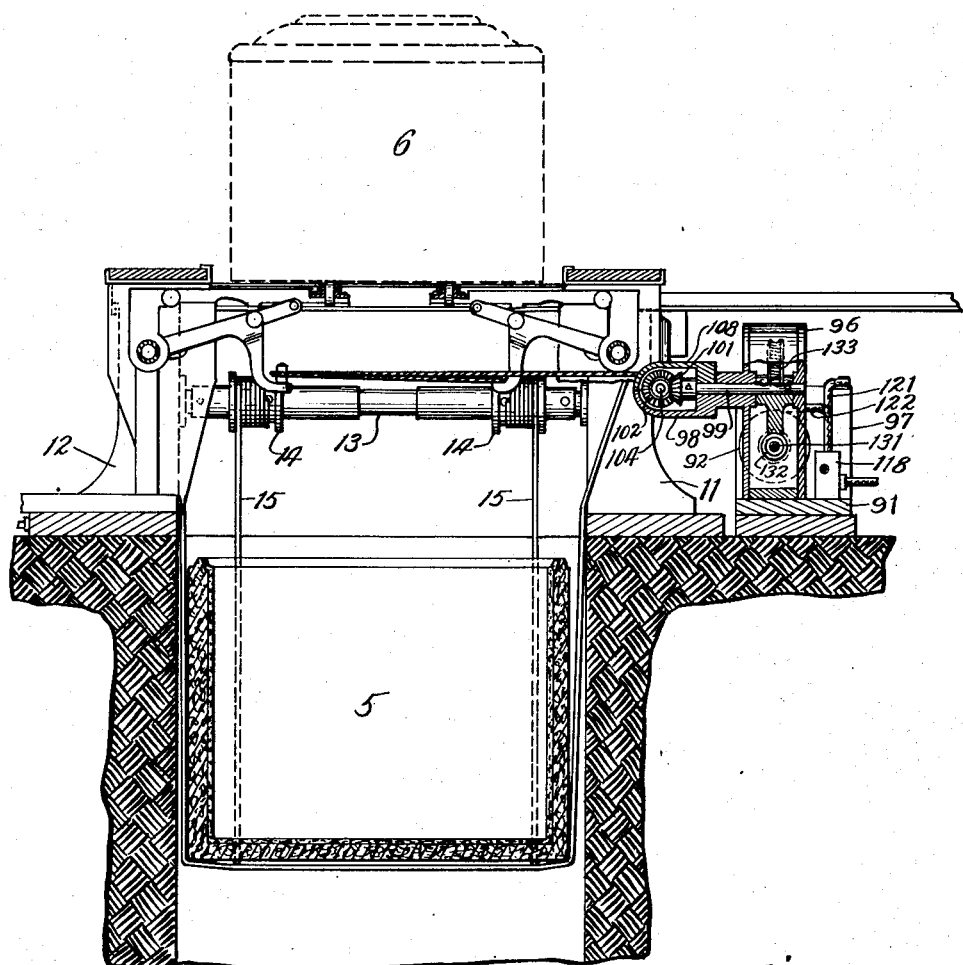
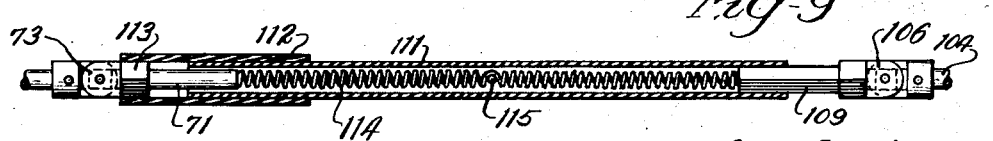

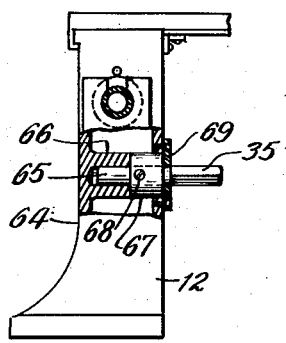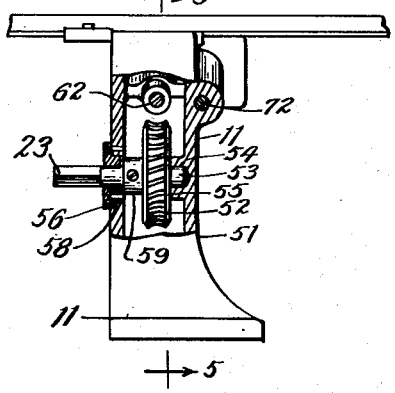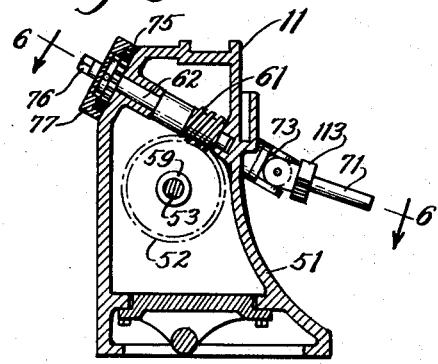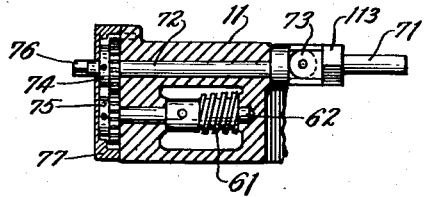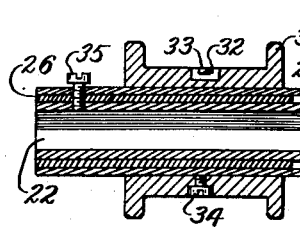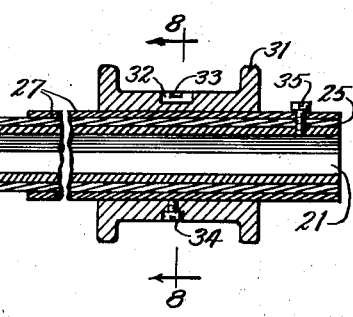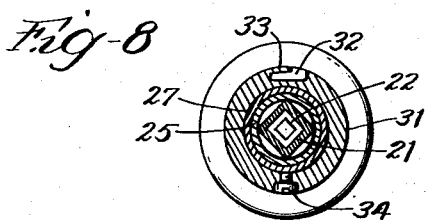

POWER OPERABLE BURIAL DEVICE

Wilbert W. Haase, Forest Park, Ill., assignor to Wilbert W. Haase Co., Forest Park, Ill., a corporation of Illinois Original application April 23, 1936, Serial No. 75,952. Divided and this application June 18, 1938, Serial No. 214,462

9 Claims. (Cl. 27—32)

This invention relates to a power operable burial device and is a division of my earlier application Serial Number 75,952, filed April 23, 1936, for Sectional burial apparatus.

An important object of this invention is to provide a motorized burial device or such a device which is equipped with power apparatus and suitable controls therefor whereby the burial device may be actuated to lift or lower a vault at the will of an operator who may upon occasion be concealed or located in a remote and inconspicuous position.

A further object of the invention is to provide a portable power attachment which may be operably attached to a burial device for raising or lowering a burial vault or casket and such a device which can be operated in remote locations such as in a cemetery where line power is not ordinarily available.

Other objects and advantages of the invention, such as the economy of construction and efficiency of operation will be apparent as it is better understood from the following description, which, taken in connection with the accompanying drawings, discloses a preferred embodiment thereof.

Referring to the drawings.

Figure 1, is a plan view of an assembled power operable burial device embodying my invention.

Fig. 2 is a transverse vertical section taken substantially on line 2—2 in Figure 1.

Fig. 3 is an elevational view of a winch pedestal broken away in part to illustrate details of construction.

Fig. 4 is an elevational view of a bearing pedestal, broken away in part to show details of construction.

Fig. 5 is an elevational section of the winch pedestal taken substantially on line 5—5 in Fig. 3.

Fig. 6 is a plan section taken substantially on line 6—6 in Fig. 5.

Fig. 7 is a longitudinal section of one of the winding shafts.

Fig. 8 is a section taken substantially on line 8—8 in Fig. 7 illustrating the construction of the winding shaft and one of the spools carried thereby; and, Fig. 9 is a longitudinal section illustrating details of construction of one of the telescoping connecting shafts.

To illustrate the invention I have shown a burial winch assembly of the type disclosed in my above mentioned earlier application of which this application is a division, and by means of which a burial vault 5 or similar burial container may be lowered into a grave excavation and a casket 6 may be lowered into the burial vault as an inciden to or during interment. In accordance with my invention a power unit 7 is shown operably attached to the burial winch assembly for effecting the above mentioned operations.

The burial winch assembly includes winch pedestals 11, bearing pedestals 12, winding shafts 13, each carrying winding spools 14, and carrier cables 15. The pedestals 11 and 12 are shown arranged at the four corners of a grave excavation or in pairs at the opposite ends thereof with a winding shaft 13 operably mounted between each pair and having the ends of the carrier cables 15 secured to the winding spools 14 thereof.

The carrier cables 15 extend between the two winding shafts 13 across the grave excavation to receive the vault 5 and rotation of the shafts 13 to wind onto or unwind cable from the shafts 13 effect corresponding elevating or lowering movement of the vault 5 carried thereby.

The winding shafts 13 illustrated in Fig. 7 are extensible to facilitate adjustment in accordance with the width of varying grave excavations and correspondingly varying sizes of vaults and caskets and each one thereof includes telescoping tubes 21 and 22 formed in cross-section in accordance with and to provide sockets for receiving square drive stems 23 extending from the winch pedestals 11. A portion of the tube 22 is formed to reduced dimensions to telescope within and rotate with the tube 21.

Spacing tubes 25 and 26 are arranged over and secured to the tubes 21 and 22 and cover tubes 27 and 28 are arranged over and similarly secured to the tubes 25 and 26.

The winding spools 31 (Figs. 7 and 8) have sockets 32 therein into which a hook finger 33 projects to which the ends of the carrier cables 15 may be anchored and the spools are suitably secured to the winding shafts 13 by means of set screws 34.

Set screws 35 facilitate rigid attachment of the winding shafts 13 to the drive stems 23 of the pedestals 11 and to similar stems 35 extending from the bearing pedestals 12.

The carrier cables 15 are wire cables of suitable length and adapted for engagement with the hook fingers 23 of the winding spools 31.

The winch pedestal 11 (Fig. 3) includes a housing 51 in which a winch gear 52 is mounted on and secured to a shaft 53 having a bearing at 54 in a boss 55 formed in the housing 51 and another bearing in a closure cap 56 suitably secured to the housing 51. An annular portion 58 of the cap 56 engages a hub portion 59 of the gear 52 and cooperates with the boss 55 to prevent axial movement thereof.

The means provided for actuating the winch gear 52 includes a worm 61 secured to a jack shaft 62 which is rotatably mounted in the housing 51 so that the worm carried thereby will engage and drive the gear 52 and which may extend from the housing 51 to facilitate the engagement thereof by means of a suitable crank for manually operating or adjusting the winch mechanism.

The plain bearing pedestal 12 (Fig. 4) similarly includes a body or housing 64 in which an idler shaft 65 is journaled in a boss 66 formed in the body 64 and is located axially by means of a collar 67 secured to the shaft 65 by means of a set screw 68. A cover member 69 which also forms a bearing for the shaft 65 secures the assembly in operable relationship.

All as described in my above mentioned earlier application which also discloses means and mechanisms whereby the casket 6 may be lowered into a vault as an incident to operation of the above described apparatus, some parts of which are shown in Figs. 1 and 2 but will not be described herein because they form no part of this invention except to the extent that they duplicate the functions of the parts above described.

In accordance with this invention the winch pedestals 11 are adapted for the connection thereto of a power drive and to accomplish this I have shown a jack shaft 72 rotatably mounted in the housing 51 adjacent the shaft 62 and substantially parallel thereto. The shaft 72 extends through the housing 51 and carries a universal joint 73 at one end and a spur gear 74 at the other end thereof. A companion spur gear 75 mounted on and secured to the shaft 62 provides a drive connection with the shaft 72. An end 76 of the shaft 72 is formed square or for a keyed connection with a suitable crank to provide means for manually adjusting or operating the winch upon occasion.

A suitable cover 77 which is apertured for the shaft 72 may be provided and attached to the housing 51 in any suitable manner.

The power unit 7 includes a support 91, which may be any suitable body on or within which the power devices may be arranged and supported, power equipment including in the present embodiment electric motors 92 and 93 connected through flexible couplings 94 and 95 to a speed reducing device 96, and a battery 97 which is electrically coupled to operate the motors 92 and 93 through suitable switches as will be later described.

The power unit is constructed and arranged to be conveniently positioned along or at one side of the burial apparatus as illustrated in Figs. 1 and 2 and is operably connected thereto by means including a gear housing 98 extending from the speed reducing device 96 into which a drive shaft 99 of the speed reducing device extends to receive a bevel gear 101 which is suitably secured for rotation therewith and is arranged to drive oppositely disposed bevel gears 102 and 103 suitably secured to stub shafts 104 and 105 respectively, each of which is journaled in the housing 98 and is suitably secured to a connecting device, such as the universal joint devices 106 and 107 illustrated. A housing cover 108 encloses the gears 101, 102 and 103 and forms a part of the bearings for the shafts 104 and 105.

Keyed or square spindles 109 extend from the universal joint devices 106 and 107 for engaging suitable connecting shafts whereby power may be transmitted to the winch pedestals and to facilitate adjustment the shafts provided for making this connection should be telescoping. To provide suitable shafts I have shown square tubes 111 of suitable length adapted to engage over or receive the spindles 109 of the universal joint devices 106 and 107, and a similarly formed extension 112 adapted to receive the tube 111 and a similarly formed part 113 of the universal joint device 73. The tube 111 and the extension 112 are proportioned to permit telescoping thereof in accordance with spacing of the winch pedestals and being of square form provide a suitable extensible drive shaft.

A spindle 71 may extend from the universal joint 72 into the tube 111 to engage a compression spring 114 which is anchored in tube 111, by means of a transverse pin 115, for centralizing the tube 111. To assemble these drive shafts the tubes 111 are first positioned over the spindles 109 with the spring 114 compressed so that the opposite end of the tube 111 will receive the spindle 71, the extension 112 is then extended and engaged with the part 113 of the universal joint 73 to form a complete driving connection as illustrated in Fig. 9.

In accordance with my invention a remote control is provided whereby the winch mechanism may be actuated and controlled from a remote location and to accomplish this push buttons 116 and 117, adapted to control a relay switch 118, are mounted adjacent the end of a cable 119 which may be of any suitable length and carries suitable wires for connecting the push buttons 116 and 117 for selectively actuating relay switch.

The relay switch 118 is connected to the battery 97 through a cable 121, to the motor 92 through an individual switch element forming a part of the switch 118 and connected for control by the push button 116 and through a cable 122 connected to the motor, and to the motor 93 through a similar individual switch connected for control by the push button 117 and a cable 123. Suitable cables 124 and 125 complete the electrical circuit by connecting the motors 92 and 93 with the battery 97.

The motors 92 and 93 are or may be suitable standard right hand or clockwise motors which when mounted in opposed relationship as illustrated will rotate in opposite directions when energized. The drive shafts of these motors are connected through the flexible couplings 94 and 95, which may be any suitable standard couplings, to the opposite ends of a high speed shaft 131 of the speed reducing device 96. A suitable worm 132 is secured to rotate with the shaft 131 and is disposed to drive a worm gear 133 carried on and secured to rotate the drive shaft 99 for driving the bevel gear 101.

The battery 97 is preferably a storage battery of suitable capacity, as illustrated.

The above described apparatus provides a power operable burial device which will effect the raising or lowering of a burial vault at the will of an operator and in response to the selective pressing of the push buttons 116 and 117 and it is obvious that the operator may be near or remote from the burial apparatus and may be concealed upon occasions.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. The combination with burial apparatus comprising, a winch mechanism arrangeable about a grave excavation and to lift or lower a burial vault therein, of a motorized power unit arrangeable adjacent and having detachable engagement with the winch mechanism including control driving devices, and devices extending from said power unit and forming detachable driving connections with said winch mechanism whereby the winch mechanism may be actuated upon occasion.

2. The combination with a burial winch mechanism, of a portable electrically operable power unit detachably engaged therewith for actuating the winch mechanism, and control means therefor including switches for determining the directional action of the power unit.

3. The combination, with a burial device including rotatable lowering means and support means therefor, of a power unit for actuating said lowering means comprising a body, a drive device extending from said body for connection to said burial device, motor means arranged to effect rotation of said drive device in either direction, battery means for energizing said motor means carried by said body, and switch devices operably connected to control operation of the drive device in either direction.

4. The combination, with a burial device including rotatable lowering means and support means therefor, of a power unit for actuating said lowering means comprising a body, a drive device extending from said body for connection to said burial device, battery operable power means connected for actuating said drive means and carried by said body, battery means carried by said body, and connecting means including switch devices whereby said power means may be actuated to effect operation of the lowering means.

5. The combination with a burial device including rotatable lowering means and support means therefor, of a power unit for actuating said lowering means comprising a body, a drive device extending from said body for connection to said burial device, battery operable power means connected for actuating said drive means and carried by said body, battery means carried by said body, and connecting means including directional control switches connected to effect operation of said power means in either a forward or a reverse direction whereby corresponding operation of the lowering means may be effected.

6. In a casket or vault lowering device of the character wherein the lowering device is provided with motive power means responsive to control for raising and controlling the lowering of the casket or vault, the combination with such power means, of manually selective means including mechanism operatively connected to said power means for effecting raising or lowering action thereof, whereby said power means may be selectively controlled.

7. In a casket or vault lowering device of the character wherein the lowering device is provided with motive power means for raising and controlling the lowering of the casket or vault, the combination with such power means of operably connected manually selective control devices individualized to the raising and the lowering control action of said power means, whereby operation of said power means may be selectively controlled.

8. For association with a casket or vault lowering device in which said device comprises means for supporting and moving the casket or vault, a selectively operable power mechanism for effecting raising or lowering movement of said casket or vault, and control means operably connected to actuate said power mechanism and being selectively operable manually whereby either raising or lowering movement of the casket or vault may be effected.

9. For association with a casket or vault lowering device in which said device comprises means for supporting and moving the casket or vault, power operated mechanism for effecting raising or lowering movement of said casket or vault in response to selective control, and remote control means operably connected to actuate said power operated mechanism and being responsive to selective manual operation whereby raising and lowering movements of the casket or vault may be effected in accordance with requirements.

WILBERT W. HAASE.